United States Patent
Lu et al.

(10) Patent No.: US 12,548,957 B2
(45) Date of Patent: Feb. 10, 2026

(54) ADAPTER, ELECTRIC VEHICLE, AND WIRE WITH POWER DELIVERY FUNCTION

(71) Applicant: DELTA ELECTRONICS, INC., Taoyuan (TW)

(72) Inventors: Ting-Yun Lu, Taoyuan (TW); Cheng-Yi Lin, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 880 days.

(21) Appl. No.: 17/865,905

(22) Filed: Jul. 15, 2022

(65) Prior Publication Data

US 2023/0283029 A1    Sep. 7, 2023

(30) Foreign Application Priority Data

Mar. 2, 2022   (TW) ................................. 111202062

(51) Int. Cl.
*H01R 31/06*  (2006.01)
*B60L 53/16*  (2019.01)

(52) U.S. Cl.
CPC .............. *H01R 31/06* (2013.01); *B60L 53/16* (2019.02); *H01R 2201/26* (2013.01)

(58) Field of Classification Search
CPC ...... H01R 31/06; H01R 2201/26; B60L 53/16
USPC ....................................................... 320/109
See application file for complete search history.

(56) References Cited

U.S. PATENT DOCUMENTS

| | | | | |
|---|---|---|---|---|
| 7,002,265 B2* | 2/2006 | Potega | ...................... | G06F 1/26 |
| | | | | 702/66 |
| 7,058,484 B1* | 6/2006 | Potega | ................ | H02J 7/00047 |
| | | | | 700/297 |
| 10,752,118 B2* | 8/2020 | Chang | ...................... | B60L 55/00 |
| 11,616,373 B2* | 3/2023 | Natarajan | ................. | G06F 1/28 |
| | | | | 320/106 |
| 11,735,941 B2* | 8/2023 | Qu | ..................... | H02J 7/007186 |
| | | | | 320/132 |
| 2018/0339595 A1* | 11/2018 | Chang | ..................... | B60L 55/00 |
| 2019/0359073 A1* | 11/2019 | Song | ..................... | H02J 7/0068 |
| 2021/0226474 A1* | 7/2021 | Liu | ........................... | H02J 7/34 |
| 2023/0031658 A1* | 2/2023 | Onishi | ..................... | B60L 53/51 |
| 2024/0391336 A1* | 11/2024 | Wilson | .................... | B60L 53/24 |

FOREIGN PATENT DOCUMENTS

| | | | | |
|---|---|---|---|---|
| EP | 2784899 A1 | * | 10/2014 | ............ H01M 10/48 |
| EP | 4297238 A1 | * | 12/2023 | ............ H02J 7/0042 |
| TW | 864860 B1 | * | 12/2024 | |

* cited by examiner

*Primary Examiner* — Suresh Memula
(74) *Attorney, Agent, or Firm* — MUNCY, GEISSLER, OLDS & LOWE, P.C.

(57) ABSTRACT

An adapter with power delivery function includes a power transmission module, a first input connector, and an output connector. The power transmission module includes a bidirectional DC charging and discharging circuit, a bypass circuit, and a control circuit. The control circuit is coupled to the bidirectional DC charging and discharging circuit and the bypass circuit. The first input connector is coupled to the bidirectional DC charging and discharging circuit, the bypass circuit, and the control circuit. The first input connector includes a high voltage level pin, a low voltage level pin, and an identification pin. The output pin is coupled to the bidirectional DC charging and discharging circuit and the bypass circuit. The present disclosure further provides an electric vehicle and a wire with power delivery function.

15 Claims, 9 Drawing Sheets

ADAPTER, ELECTRIC VEHICLE, AND WIRE WITH POWER DELIVERY FUNCTION

BACKGROUND

Technical Field

The present disclosure relates to an adapter, an electric vehicle, and a wire, and more particularly to an adapter, an electric vehicle, and a wire with power delivery function.

Description of Related Art

The statements in this section merely provide background information related to the present disclosure and do not necessarily constitute prior art.

Since the chargers used in the current electric passenger vehicles (electric vehicles) are all dedicated chargers, different electric vehicles cannot be mixed. Moreover, since the chargers are all switched-mode power supplies (SMPS) that convert AC power to DC power, when charging is required, an AC power outlet must be found, thus significantly limiting the field of use for charging.

In addition, the battery inside the electric vehicle is only enough to drive the motor of the electric vehicle or maintain the system of the electric vehicle itself, or smaller power (such as 15 watts) is outputted through the Type-A connector to supply small handheld devices so the ductility and flexibility of the current electric vehicles are poor.

Accordingly, the present disclosure provides an adapter, an electric vehicle, and a wire to solve the problems and technical bottlenecks existing in the existing technology.

SUMMARY

An object of the present disclosure is to provide an adapter with power delivery function to solve the problems of existing technology.

The adapter with power delivery function includes a power transmission module, a first input connector, and an output connector. The power transmission module includes a bidirectional DC charging and discharging circuit, a bypass circuit, and a control circuit. The control circuit is coupled to the bidirectional DC charging and discharging circuit and the bypass circuit. The first input connector is coupled to the bidirectional DC charging and discharging circuit, the bypass circuit, and the control circuit. The first input connector comprising a high voltage level pin, a low voltage level pin, and an identification pin. The output connector is coupled to the bidirectional DC charging and discharging circuit and the bypass circuit.

Another object of the present disclosure is to provide an electric vehicle with power delivery function to solve the problems of existing technology.

The electric vehicle with power delivery function includes a power transmission module, an input connector, and an electric vehicle. The power transmission module includes a bidirectional DC charging and discharging circuit, a bypass circuit, and a control circuit. The control circuit is coupled to the bidirectional DC charging and discharging circuit and the bypass circuit. The input connector is coupled to the bidirectional DC charging and discharging circuit, the bypass circuit, and the control circuit. The input connector includes a high voltage level pin, a low voltage level pin, and an identification pin. The power transmission module is disposed inside the electric vehicle.

Further another object of the present disclosure is to provide a wire with power delivery function to solve the problems of existing technology.

The wire with power delivery function includes a power transmission module, a wire connector, and an output connector. The power transmission module includes a bidirectional DC charging and discharging circuit and a control circuit. The control circuit is coupled to the bidirectional DC charging and discharging circuit. The wire connector is coupled to the bidirectional DC charging and discharging circuit and the control circuit. The wire connector is a Type-C connector. The output connector is coupled to the bidirectional DC charging and discharging circuit.

Accordingly, the present disclosure has the following features and advantages: 1. The power transmission module proposed in the present disclosure has bidirectional input and output and charging control functions, which can allow the battery in the electric vehicle to accept any power supply with USB Type-C PD standard, thereby significantly increasing the convenience of users. It can even be plugged into a power bank or directly connected to the USB Type-C output of the car, which can allow users to charge the battery of the electric vehicle without AC power, thereby significantly increasing the convenience of use; 2. In addition to the convenience of charging, the power transmission module can also output the power of the battery through the USB Type-C PD to support many USB Type-C systems so that the battery of the electric vehicle can support more mobile devices through the power transmission module of the present disclosure; 3. A lot of system usage information can be transmitted through USB Type-C, which can allow users to more easily acquire system data or send data back to the manufacturer to provide more follow-up services and timely monitor the status of products; 4. In addition to use the PD protocol, some power transmission modules also have a direct charging function in constant current (CC) operation mode or an exclusive charger, which can directly charge the battery of the electric vehicle so as to save DC/DC conversion power consumption, thereby achieving higher charging efficiency.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1A:
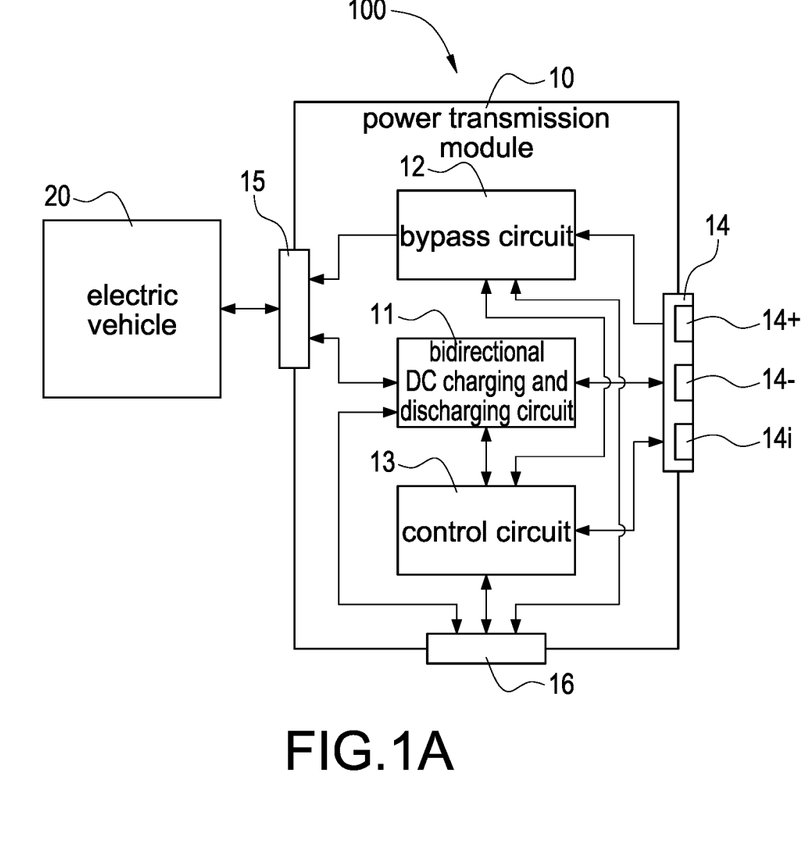
FIG. 1A is a block diagram of an adapter with power delivery function applied to an electric vehicle according to the present disclosure.

Please refer to FIG. 1A, which shows a block diagram of an adapter with power delivery function applied to an electric vehicle according to the present disclosure. The adapter 100 with power delivery (PD) function includes a power transmission module 10, a first input connector 14, a second input connector 16, and an output connector 15. The power transmission module 10 includes a bidirectional DC charging and discharging circuit 11, a bypass circuit 12, and a control circuit 13. The control circuit 13 is coupled to the bidirectional DC charging and discharging circuit 11 and the bypass circuit 12.

The first input connector 14 is coupled to the bidirectional DC charging and discharging circuit 11, the bypass circuit 12, and the control circuit 13. The first input connector 14 includes a high voltage level pin 14+, a low voltage level pin 14−, and an identification pin 14i. In one embodiment, the first input connector 14 is a Cannon connector (i.e., an XLR connector). Please refer to FIG. 4, the high voltage level pin 14+ is a positive voltage pin, the low voltage level pin 14− is a negative voltage pin, and the identification pin 14i is a pin for identifying an external power apparatus. Specifically, the identification pin 14i has a communication function with a USB Type-C configuration channel so that the first input connector 14 may communicate with the external power apparatus when the first input connector 14 detects that the external power apparatus has a power delivery (PD) protocol. The second input connector 16 is coupled to the bidirectional DC charging and discharging circuit 11, the bypass circuit 12, and the control circuit 13. The output connector 15 is coupled to the bidirectional DC charging and discharging circuit 11 and the bypass circuit 12. In one embodiment, the second input connector 16 is a USB Type-C connector (hereinafter referred to as Type-C connector).

The power transmission module 10 is connected to an electric vehicle 20 through the output connector 15. In one embodiment, the output connector 15 and the corresponding connector of the electric vehicle 20 is the same as the first input connector 14, and may be a Cannon connector with a positive voltage pin, a negative voltage pin, and an identification pin of identifying the external power apparatus. In particular, the identification pin may be connected to a positive polarity of a power voltage, a negative polarity of the power voltage, no connection, or have a communication function (such as a single-wire UART). In this present disclosure, the electric vehicle 20 may be, for example, but not limited to an electric motorcycle, an electric bicycle, an electric wheelchair, or an electric scooter.

The power transmission module 10 is connected to an external power apparatus through the first input connector 14 so that the electric vehicle 20 can be supplied power (charged) by the external power apparatus through the power transmission module 10. Therefore, the battery (not shown) installed in the electric vehicle 20, such as a rechargeable battery and a storage battery, can be charged by the external power apparatus. Specifically, if the control circuit 13 determines that the external power apparatus has a power delivery (PD) protocol through the identification pin 14i, the external power apparatus is controlled to supply power to (charge) the electric vehicle 20 through the bidirectional DC charging and discharging circuit 11. On the contrary, if the control circuit 13 determines that the external power apparatus does not have the power delivery protocol, the external power apparatus is controlled to supply power to (charge) the electric vehicle 20 through the bypass circuit 12 (i.e., not through the bidirectional DC charging and discharging circuit 11).

In the present disclosure, the application of the adapter with the power delivery function to the electric vehicle can be realized through different implementations, and the following will describe the various implementations in detail. However, the application of the adapter with power delivery function of the present disclosure to electric vehicles is not limited by the embodiments disclosed below. Various substitutions and modifications have been suggested in the foregoing description, and others will occur to those of ordinary skill in the art. Therefore, all such substitutions and modifications are intended to be embraced within the scope of the present disclosure.

Figure 1B:
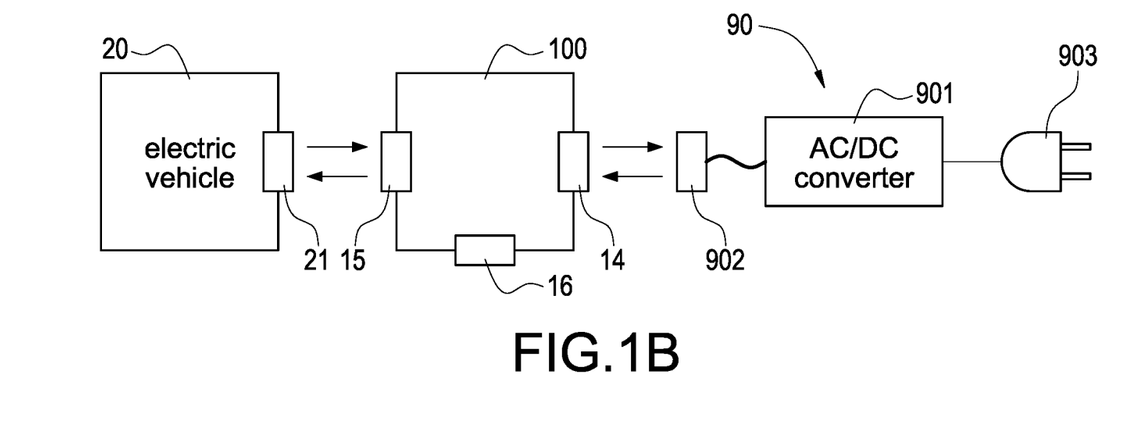
FIG. 1B is a block diagram of the adapter shown in FIG. 1A used for charging the electric vehicle through an external power apparatus according to a first embodiment of the present disclosure.
Figure 1C:
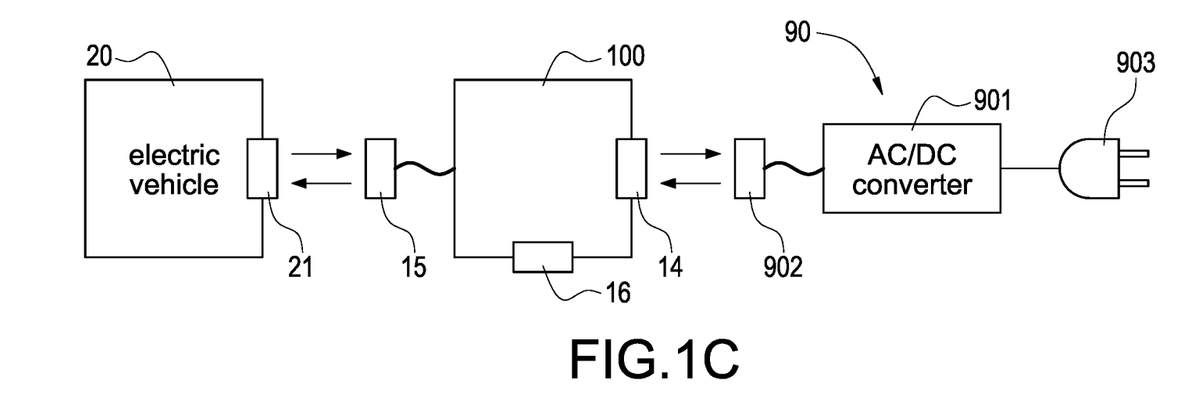
FIG. 1C is a block diagram of the adapter shown in FIG. 1A used for charging the electric vehicle through the external power apparatus according to a second embodiment of the present disclosure.
Figure 1D:
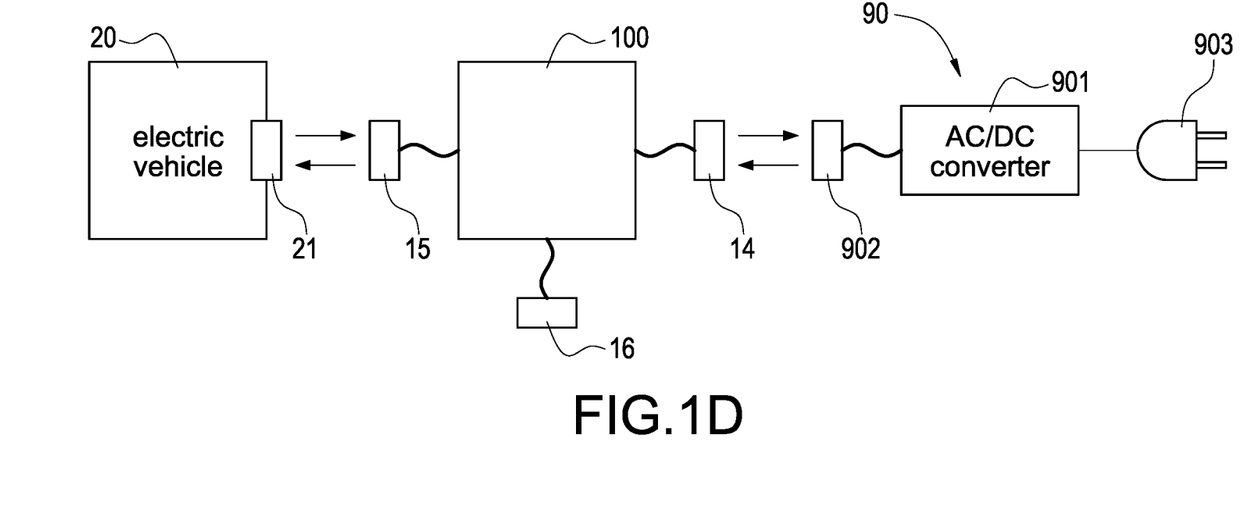
FIG. 1D is a block diagram of the adapter shown in FIG. 1A used for charging the electric vehicle through the external power apparatus according to a third embodiment of the present disclosure.

Please refer to FIG. 1B, FIG. 1C, FIG. 1D, which show a block diagram of the adapter shown in FIG. 1A used for charging the electric vehicle through an external power apparatus according to a first embodiment, a second embodiment, and a third embodiment of the present disclosure, respectively. The adapter 100 shown in FIG. 1B, FIG. 1C, and FIG. 1D includes a power transmission module 10 to provide a bi-directional power transmission function. In one embodiment, the output connector 15 is connected to the electric vehicle 20. Specifically, the output connector 15 is a male XLR, and the electric vehicle 20 has a female XLR correspondingly so that the output connector 15 is connected to the electric vehicle 20. In addition, the second input connector 16 (Type-C connector) is used for bidirectional power transmission, including allowing the battery in the electric vehicle 20 to be charged by the external power source through the second input connector 16, and also allowing the battery energy in the electric vehicle 20 to be provided to external loads, for example, but not limited to portable devices such as mobile phones, laptops, tablets, and so on through the second input connector 16.

In one embodiment, the external power apparatus 90 includes an AC/DC converter 901, a first power-supplying connector 902, and a power connector 903. The AC/DC converter 901 has a power input end and a power output end. The first power-supplying connector 902 is connected to the power output end of the AC/DC converter 901, and the power connector 903 is connected to the power input end of the AC/DC converter 901. In particular, the power connector 903 is used to connect to an AC power source, for example, but not limited to an AC mains.

As shown in embodiments of FIG. 1B, FIG. 1C, and FIG. 1D, the electric vehicle 20 includes a vehicle connector 21 for transmitting power. In one embodiment, the vehicle connector 21 is a female XLR, and the output connector 15 of the power transmission module 10 is a male XLR correspondingly so that the output connector 15 is connected to the electric vehicle 20. Alternatively, the vehicle connector 21 is a male XLR, and the output connector 15 of the power transmission module 10 is a female XLR correspondingly so that the output connector 15 is connected to the electric vehicle 20.

Furthermore, the first power-supplying connector 902 is a male XLR, and the first input connector 14 of the power transmission module 10 is a female XLR correspondingly so that the first input connector 14 is connected to the external power apparatus 90. Incidentally, the connector in this embodiment is in the form of a male type or a female type only for convenience and clear description, and is not intended to limit the present disclosure. As long as the male and female connectors can be properly matched and connected, they should be embraced within the scope of the present disclosure.

As shown in FIG. 1B, the first input connector 14 and the output connector 15 are disposed on a body of the power transmission module 10. The first power-supplying connector 902 extends from the AC/DC converter 901 through a wire. The difference between FIG. 1C and FIG. 1B is that the output connector 15 extends from the body of the power transmission module 10 through a wire. The difference between FIG. 1D and FIG. 1B is that the first input connector 14, the output connector 15, and the second input connector 16 extend from the body of the power transmission module 10. However, the connection relationship between the first input connector 14, the output connector 15, the second input connector 16, and the power transmission module 10 is not limited to FIG. 1B to FIG. 1D. That is, any one thereof extending from the body of the power transmission module 10 through a wire or any one thereof disposed on the body of the power transmission module 10 should be embraced within the scope of the present disclosure.

Therefore, through the configuration and electrical connection shown in FIG. 1B, FIG. 1C, and FIG. 1D, the external power apparatus 90 may supply power to the electric vehicle 20 through the adapter 100. Incidentally, since the first power-supplying connector 902 is connected to the first input connector 14, the control circuit 13 of the power transmission module 10 determines that the external power apparatus 90 has the power delivery (PD) protocol but does not have the direct charging function, and the external power apparatus 90 is controlled to supply power to (charge) the electric vehicle 20 through the bidirectional DC charging and discharging circuit 11. Alternatively, the control circuit 13 determines that the external power apparatus 90 has the power delivery (PD) protocol and has the direct charging function, and the external power apparatus 90 is controlled to supply power to (charge) the electric vehicle 20 through the bypass circuit 12. On the contrary, the control circuit 13 determines that the external power apparatus 90 does not have the power delivery (PD) protocol, the external power apparatus 90 is controlled to supply power to (charge) the electric vehicle 20 through the bypass circuit 12.

Figure 2A:
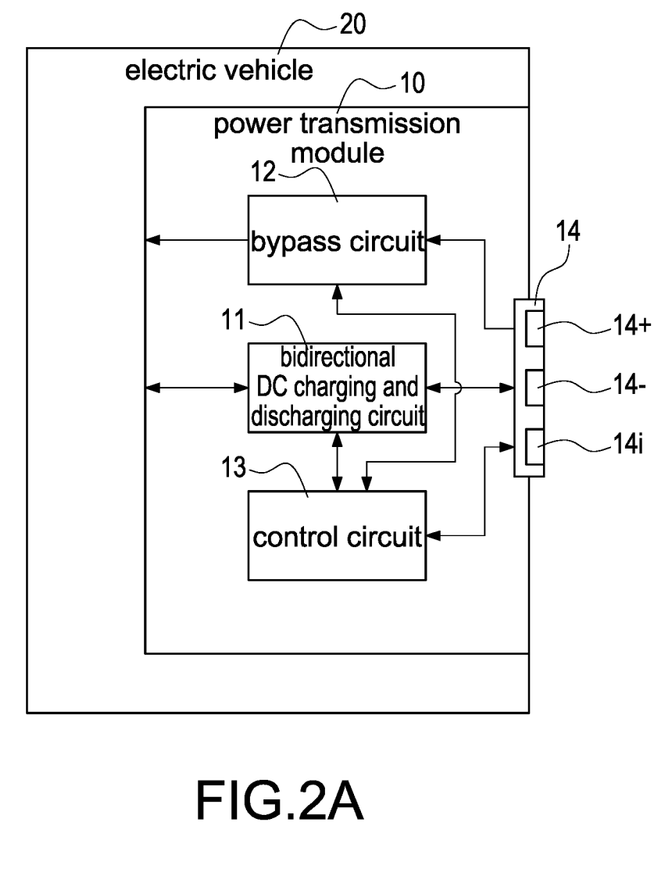
FIG. 2A is a block diagram of an electric vehicle with power delivery function according to the present disclosure.

Please refer to FIG. 2A, which shows a block diagram of an electric vehicle with power delivery function according to the present disclosure. The major difference between FIG. 2A and FIG. 1A is that the electric vehicle 20 includes the power transmission module 10 and the power transmission module 10 is disposed inside the electric vehicle 20. Since the power transmission module 10 is disposed inside the electric vehicle 20, FIG. 2A does not include the output connector 15 shown in FIG. 1A for connecting to the electric vehicle 20. The specific circuit description of FIG. 2A may refer to the disclosure of FIG. 1A, and the detail description is omitted here for conciseness.

Figure 2B:
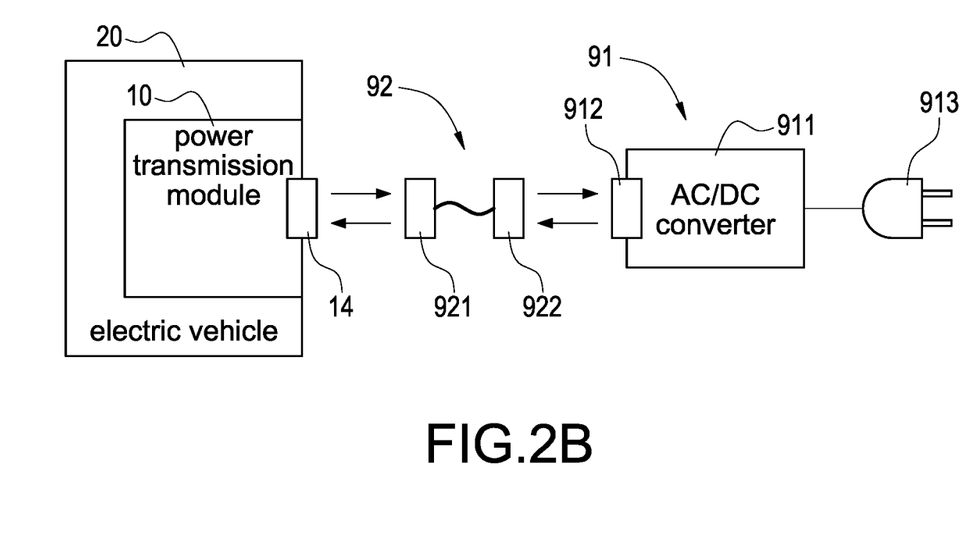
FIG. 2B is a block diagram of the electric vehicle shown in FIG. 2A used for charging the electric vehicle through an external power apparatus according to the present disclosure.
Figure 4:
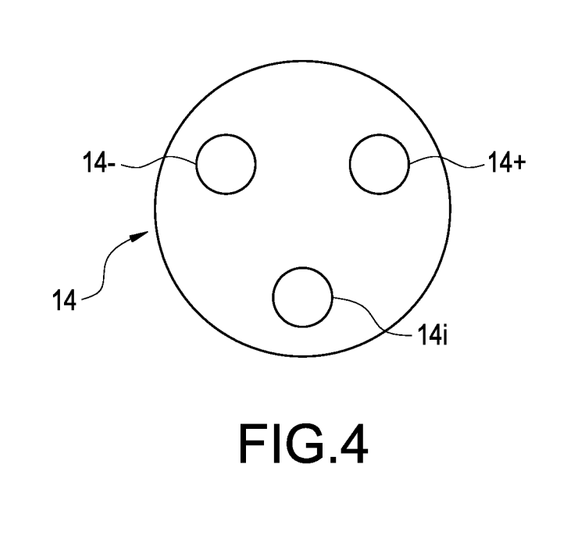
FIG. 4 is a schematic diagram of an XLR connector according to the present disclosure.

Please refer to FIG. 2B, which shows a block diagram of the electric vehicle shown in FIG. 2A used for charging the electric vehicle through an external power apparatus according to the present disclosure. The electric vehicle 20 shown in FIG. 2B includes a power transmission module 10 to provide a bi-directional power transmission function. In one embodiment, the input connector 14 is a Cannon connector (i.e., an XLR connector), and the high voltage level pin 14+ is a positive voltage pin, the low voltage level pin 14− is a negative voltage pin, and the identification pin 14i is a pin for identifying an external power apparatus as shown in FIG. 4.

In one embodiment, the external power apparatus 91 includes an AC/DC converter 911, a second power-supplying connector 912, and a power connector 913. The AC/DC converter 911 has a power input end and a power output end. The second power-supplying connector 912 is connected to the power output end of the AC/DC converter 911, and the power connector 913 is connected to the power input end of the AC/DC converter 911. The second power-supplying connector 912 is connected to the input connector 14 through a connection wire 92.

The connection wire 92 includes a first connector 921 and a second connector 922. The first connector 921 is connected to the input connector 14, and the second connector 922 is connected to the second power-supplying connector 912. In one embodiment, the first connector 921 is a male XLR, the input connector 14 is a female XLR, the second connector 922 is a male Type-C connector, and the second power-supplying connector 912 is a female Type-C connector. Using the wiring manner of the connection wire 92, a power pin (Vbus), channel configuration pins (CC1, CC2), and a ground pin (GND) of the second connector 922 are converted into corresponding connector forms (in this embodiment, i.e., the first connector 921 with the male XLR) so that the transmission content of the high voltage level pin 14+, the low voltage level pin 14−, and the identification pin 14i of the input connector 14 has a USB PD (power delivery) communication function, and then it is determined whether the external power apparatus 91 has a power delivery protocol.

Therefore, through the configuration and electrical connection of FIG. 2B, the external power apparatus 91 may supply power to (charge) the electric vehicle 20 through the connection wire 92, or the power in the electric vehicle 20 may be provided to an external load through the connection wire 92 so as to realize bidirectional power transmission.

Incidentally, since the first connector 921 is connected to the input connector 14, the control circuit 13 of the power transmission module 10 determines that the external power apparatus 91 has the power delivery (PD) protocol but does not have the direct charging function, and the external power apparatus 91 is controlled to supply power to (charge) the electric vehicle 20 through the bidirectional DC charging and discharging circuit 11. Alternatively, the control circuit 13 determines that the external power apparatus 91 has the power delivery (PD) protocol and has the direct charging function, and the external power apparatus 91 is controlled to supply power to (charge) the electric vehicle 20 through the bypass circuit 12. On the contrary, the control circuit 13 determines that the external power apparatus 91 does not have the power delivery (PD) protocol, the external power apparatus 91 is controlled to supply power to (charge) the electric vehicle 20 through the bypass circuit 12. Incidentally, in different embodiments, the external apparatus 91 may provide the first connector 921 with a wire (output wire/cable), which means that the physical connection between the second power-supplying connector 912 and the second connector 922 may be omitted, and the first connector 921 may be directly connected to the input connector 14.

Figure 3A:
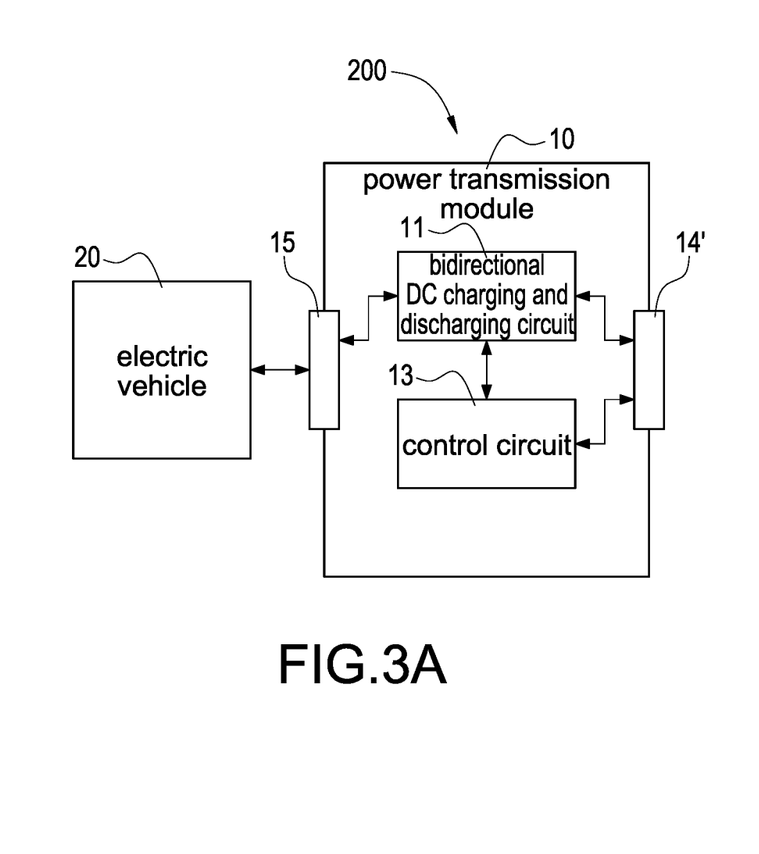
FIG. 3A is a block diagram of a wire with power delivery function applied to an electric vehicle according to a first embodiment of the present disclosure.

Please refer to FIG. 3A, which shows a block diagram of a wire with power delivery function applied to an electric vehicle according to a first embodiment of the present disclosure. The wire 200 includes a power transmission module 10, a wire connector 14', and an output connector 15. The power transmission module 10 includes a bidirectional DC charging and discharging circuit 11 and a control circuit 13. The control circuit 13 is coupled to the bidirectional DC charging and discharging circuit 11. The output connector 15 is coupled to the bidirectional DC charging and discharging circuit 11. The power transmission module 10 is connected to the electric vehicle 20 through the output connector 15.

The wire connector 14' is coupled to the bidirectional DC charging and discharging circuit 11 and the control circuit 13. In one embodiment, the wire connector 14' is a Type-C connector. In other words, the power transmission module 10 is disposed inside the wire 200, and since the wire connector 14' is a Type-C connector (described in detail later), the power transmission module 10 does not need related circuits such as the bypass circuit 12.

Figure 3B:
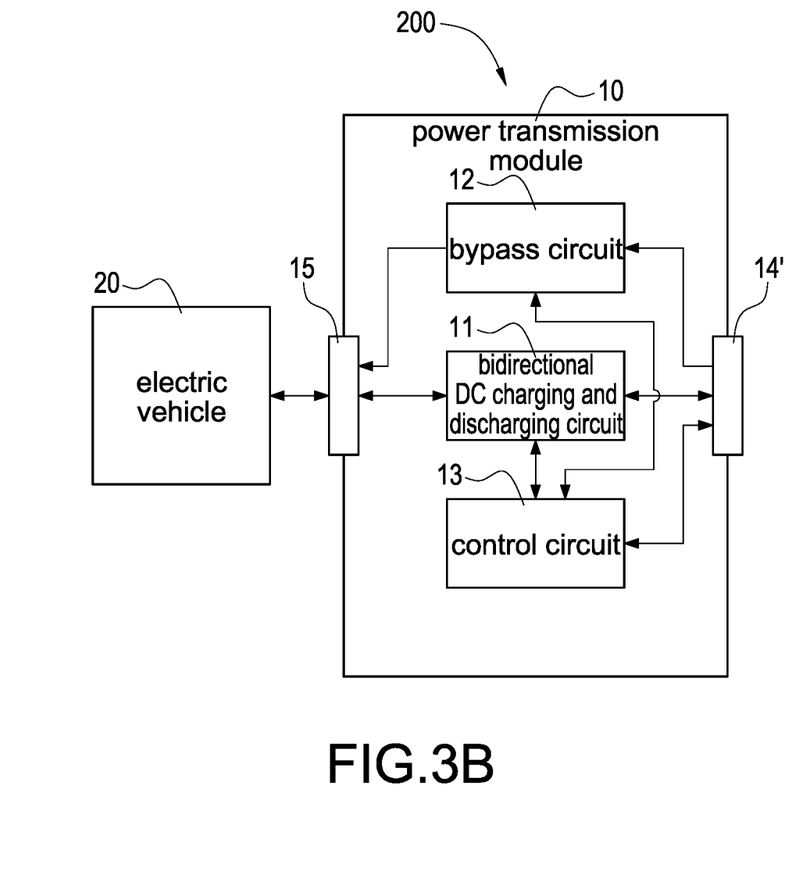
FIG. 3B is a block diagram of the wire with power delivery function applied to the electric vehicle according to a second embodiment of the present disclosure.

Compared with the first embodiment without the bypass circuit 12 shown in FIG. 3A, the wire 200 may further include the bypass circuit 12, as shown in FIG. 3B. The specific description of the connection relationship between the bypass circuit 12 and the control circuit 13, the wire connector 14' and the output connector 15 and the operation principle can be found in FIG. 1A and the corresponding description, and the detail description is omitted here for conciseness.

Figure 3C:
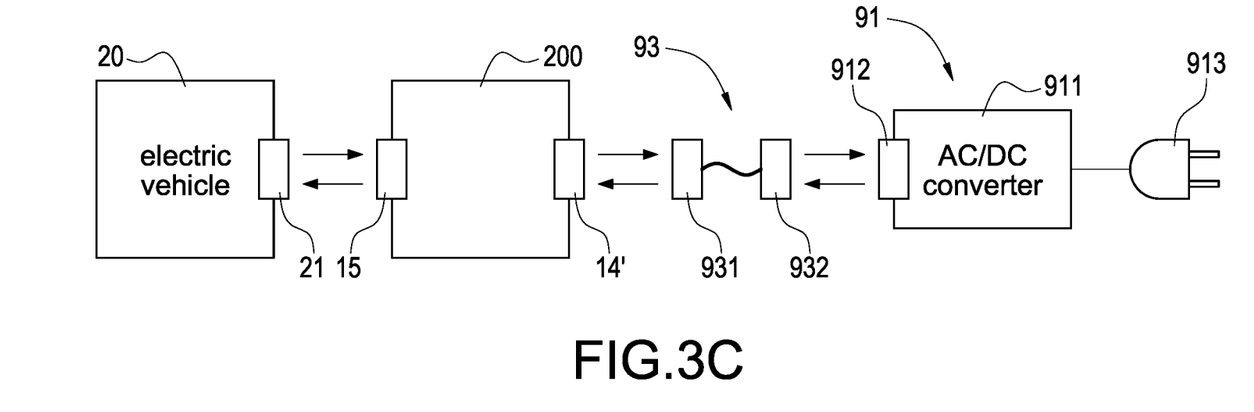
FIG. 3C is a block diagram of the wire shown in FIG. 3A used for charging the electric vehicle through an external power apparatus according to a first embodiment of the present disclosure.

Please refer to FIG. 3C, which shows a block diagram of the wire shown in FIG. 3A used for charging the electric vehicle through an external power apparatus according to a first embodiment of the present disclosure. The external apparatus 91 includes an AC/DC converter 911, a second power-supplying connector 912, and a power connector 913. The AC/DC converter 911 has a power input end and a power output end. The second power-supplying connector 912 is connected to the power output end of the AC/DC converter 911, and the power connector 913 is connected to the power input end of the AC/DC converter 911. The second power-supplying connector 912 is connected to the wire connector 14' through a connection wire 93.

The connection wire 93 includes a third connector 931 and a fourth connector 932. The third connector 931 is connected to wire connector 14', and the fourth connector 932 is connected to the second power-supplying connector 912. The wire connector 14' and the output connector 15 are disposed on the body of the power transmission module 10. Specifically, the third connector 931 is a male Type-C connector, the wire connector 14' is a female Type-C connector, the fourth connector 932 is a male Type-C connector, and the second power-supplying connector 912 is a female Type-C connector. Incidentally, in different embodiments, the external apparatus 91 may provide the third connector 931 with a wire (output wire/cable), which means that the physical connection between the second power-supplying connector 912 and the fourth connector 932 may be omitted, and the third connector 931 may be directly connected to the wire connector 14'.

Figure 3D:
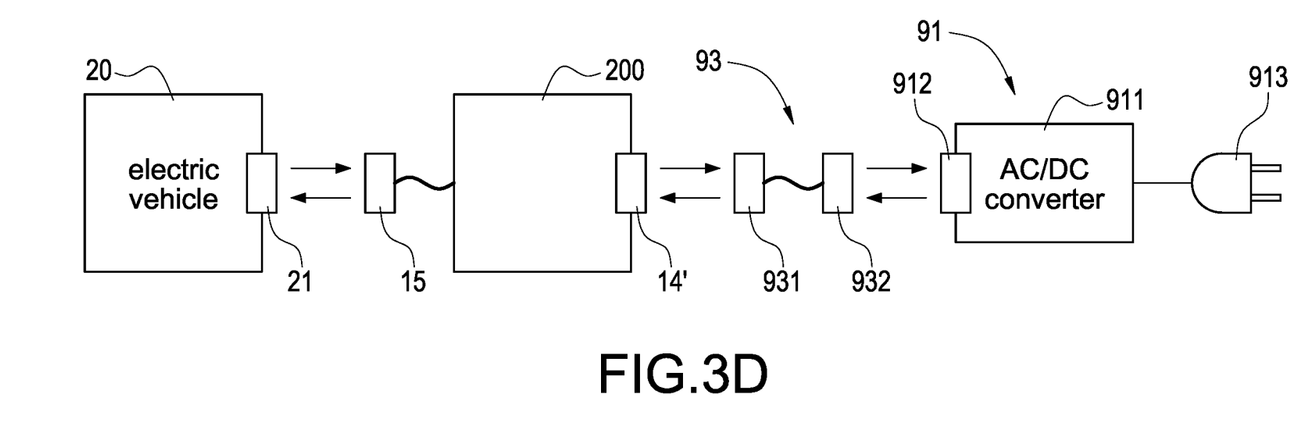
FIG. 3D is a block diagram of the wire shown in FIG. 3A used for charging the electric vehicle through the external power apparatus according to a second embodiment of the present disclosure.

Please refer to FIG. 3D, which shows a block diagram of the wire shown in FIG. 3A used for charging the electric vehicle through the external power apparatus according to a second embodiment of the present disclosure. The difference between FIG. 3D and FIG. 3C is that the wire connector 14' of the second embodiment (shown in FIG. 3D) is disposed on the body of the power transmission module 10, and the output connector 15 extends from the body of the power transmission module 10 through a wire.

Therefore, through the configuration and electrical connection of FIG. 3C and FIG. 3D, the external power apparatus 91 may supply power to (charge) the electric vehicle 20 through the connection wire 93 and the wire 200, or the power in the electric vehicle 20 may be provided to an external load through the connection wire 93 and the wire 200 so as to realize bidirectional power transmission. Incidentally, since the wire connector 14' is a Type-C connector, the control circuit 13 of the power transmission module 10 determines that the external power apparatus 91 has the power delivery (PD) protocol but does not have the direct charging function, and the external power apparatus 91 is controlled to supply power to (charge) the electric vehicle 20 through the bidirectional DC charging and discharging circuit 11. Alternatively, the control circuit 13 determines that the external power apparatus 91 has the power delivery (PD) protocol and has the direct charging function, and the external power apparatus 91 is controlled to supply power to (charge) the electric vehicle 20 through the bypass circuit 12. On the contrary, the control circuit 13 determines that the external power apparatus 91 does not have the power delivery (PD) protocol, the external power apparatus 91 is controlled to supply power to (charge) the electric vehicle 20 through the bypass circuit 12.

Figure 3E:
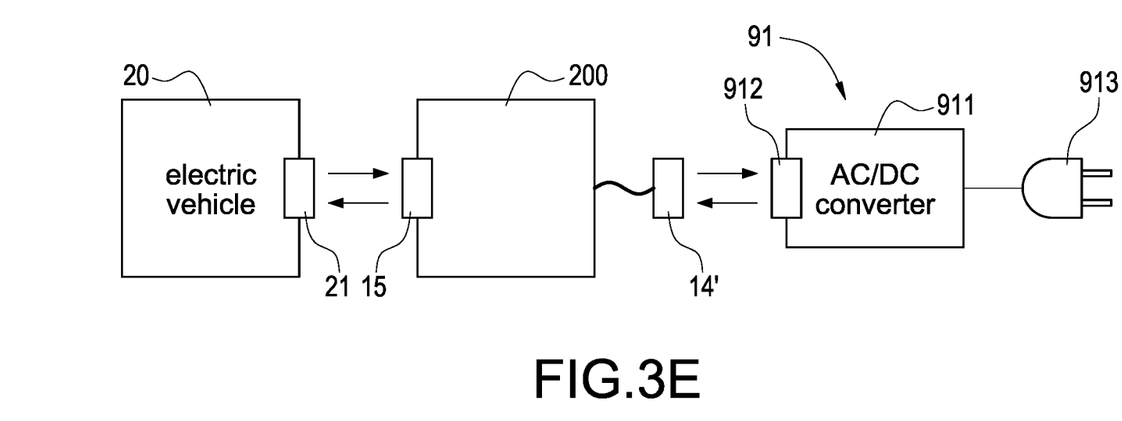
FIG. 3E is a block diagram of the wire shown in FIG. 3A used for charging the electric vehicle through the external power apparatus according to a third embodiment of the present disclosure.

Please refer to FIG. 3E, which shows a block diagram of the wire shown in FIG. 3A used for charging the electric vehicle through the external power apparatus according to a third embodiment of the present disclosure. The external power apparatus 91 is connected to the power transmission module 10 through the wire connector 14'. The wire connector 14' extends from the body of the power transmission module 10 through a wire, and the output connector 15 is disposed on the body of the power transmission module 10. Therefore, the external power apparatus 91 supplies power to the electric vehicle 20 through the bidirectional DC charging and discharging circuit 11, or directly supplies power to the electric vehicle 20 through the bypass circuit 12. In one embodiment, the wire connector 14' is a male Type-C connector and the second power-supplying connector 912 is a female Type-C connector.

Therefore, through the configuration and electrical connection of FIG. 3E, the external power apparatus 91 may supply power to (charge) the electric vehicle 20 through the wire 200. Incidentally, since the wire connector 14' is a Type-C connector, the control circuit 13 of the power transmission module 10 determines that the external power apparatus 91 has the power delivery (PD) protocol, and the external power apparatus 91 is controlled to supply power to (charge) the electric vehicle 20 through the bidirectional DC charging and discharging circuit 11 or through the bypass circuit 12. Similarly, the electric vehicle 20 may also provide power to an external load through the wire 200 to realize bidirectional power transmission.

Incidentally, the connection relationship between the wire connector 14', the output connector 15, and the power transmission module 10 is not limited to FIG. 3B to FIG. 3E, that is, any one extending from the body of the wire 200 through the wire or any one disposed on the body of the wire 200 should be embraced within the scope of the present disclosure.

In summary, the present disclosure has the following features and advantages:

1. The power transmission module proposed in the present disclosure has bidirectional input and output and charging control functions, which can allow the battery in the electric vehicle to accept any power supply with USB PD standard, thereby significantly increasing the convenience of users. It can even be plugged into a power bank or directly connected to the USB Type-C output of the car, which can allow users to charge the battery of the electric vehicle without AC power, thereby significantly increasing the convenience of use.
2. In addition to the convenience of charging, the power transmission module can also output the power of the battery through the USB Type-C PD to support many USB Type-C systems so that the battery of the electric vehicle can support more mobile devices through the power transmission module of the present disclosure.
3. A lot of system usage information can be transmitted through USB Type-C, which can allow users to more easily acquire system data or send data back to the manufacturer to provide more follow-up services and timely monitor the status of products.
4. In addition to use the PD protocol, some power transmission modules also have a direct charging function in constant current (CC) operation mode or an exclusive charger, which can directly charge the battery of the electric vehicle so as to save the power conversion of the charging and discharging circuit and save the consumption of DC/DC conversion, thereby achieving higher charging efficiency.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An adapter with power delivery function, comprising:
   a power transmission module, comprising:
   a bidirectional DC charging and discharging circuit,
   a bypass circuit, and
   a control circuit, coupled to the bidirectional DC charging and discharging circuit and the bypass circuit,
   a first input connector, coupled to the bidirectional DC charging and discharging circuit, the bypass circuit, and the control circuit; the first input connector comprising a high voltage level pin, a low voltage level pin, and an identification pin, and
   an output connector, coupled to the bidirectional DC charging and discharging circuit and the bypass circuit.

2. The adapter with power delivery function as claimed in claim 1, wherein the power transmission module is connected to an electric vehicle through the output connector.

3. The adapter with power delivery function as claimed in claim 2, wherein an external power apparatus is connected to the power transmission module through the first input connector,
   when the control circuit determines that the external power apparatus has a power delivery protocol but does not have a direct charging function through the identification pin, the external power apparatus is controlled to supply power to the electric vehicle through the bidirectional DC charging and discharging circuit,
   when the control circuit determines that the external power apparatus has the power delivery protocol and has the direct charging function, the external power apparatus is controlled to supply power to the electric vehicle through the bypass circuit,
   when the control circuit determines that the external power apparatus does not have the power delivery protocol, the external power apparatus is controlled to supply power to the electric vehicle through the bypass circuit.

4. The adapter with power delivery function as claimed in claim 1, further comprising:
   a second input connector, coupled to the bidirectional DC charging and discharging circuit, the bypass circuit, and the control circuit.

5. The adapter with power delivery function as claimed in claim 4, wherein the second input connector is a Type-C connector.

6. The adapter with power delivery function as claimed in claim 4, wherein an external power apparatus is connected to the power transmission module through the second input connector,
   when the control circuit determines that the external power apparatus has a power delivery protocol, the external power apparatus is controlled to supply power to an electric vehicle through the bidirectional DC charging and discharging circuit,
   when the control circuit determines that the external power apparatus has the direct charging function, the external power apparatus is controlled to supply power to the electric vehicle through the bypass circuit.

7. The adapter with power delivery function as claimed in claim 1, wherein the first input connector is an XLR connector; the high voltage level pin is a positive voltage pin, the low voltage level pin is a negative voltage pin, and the identification pin is a pin for identifying an external power apparatus.

8. The adapter with power delivery function as claimed in claim 3, wherein the electric vehicle comprises a vehicle connector,
   wherein the vehicle connector is a female XLR connector and the output connector of the power transmission module is a male XLR connector, or the vehicle connector is a male XLR connector and the output connector of the power transmission module is a female XLR connector.

9. The adapter with power delivery function as claimed in claim 4, wherein at least one of the first input connector, the second input connector, and the output connector is disposed on the body of the power transmission module, or at least one of the first input connector, the second input connector, and the output connector extends from the body of the power transmission module through a wire.

10. A wire with power delivery function, comprising:
a power transmission module, comprising:
a bidirectional DC charging and discharging circuit, and
a control circuit, coupled to the bidirectional DC charging and discharging circuit,
a wire connector, coupled to the bidirectional DC charging and discharging circuit and the control circuit; wherein the wire connector is a Type-C connector, and
an output connector, coupled to the bidirectional DC charging and discharging circuit.

11. The wire with power delivery function as claimed in claim 10, further comprising:
a bypass circuit, coupled to the control circuit, the wire connector, and the output connector.

12. The wire with power delivery function as claimed in claim 10, wherein the output connector is an XLR connector, and the power transmission module is connected to an electric vehicle through the output connector.

13. The wire with power delivery function as claimed in claim 12, wherein the power transmission module is disposed in the wire connector or the output connector.

14. The wire with power delivery function as claimed in claim 13, wherein the power transmission module is disposed on a body of the wire connector and the output connector is connected to the body through a wire, or the power transmission module is disposed on a body of the output connector and the wire connector is connected to the body through a wire.

15. The wire with power delivery function as claimed in claim 13, wherein an external power apparatus supplies power to the electric vehicle through the bidirectional DC charging and discharging circuit or the bypass circuit, or the electric vehicle supplies to a load through the bidirectional DC charging and discharging circuit.

* * * * *